United States Patent Office 3,679,632
Patented July 25, 1972

3,679,632
POLYAMIDE ACID COMPOSITION AND METHOD OF PREPARATION
Ralph G. Flowers, Pittsfield, and Thomas L. Sherer, Richmond, Mass., assignors to General Electric Company
No Drawing. Continuation-in-part of application Ser. No. 641,131, May 25, 1967. This application Dec. 29, 1969, Ser. No. 888,852
Int. Cl. C08g 20/32
U.S. Cl. 260—47 CP    4 Claims

ABSTRACT OF THE DISCLOSURE

A polyamide-acid is prepared by reacting a dianhydride with a diamine formed from the reaction of a diepoxide compound and a diamine. The resultant polyamide-acid is then converted to a polyimide by heating. The polyimide compound is useful for electrical insulating purposes, especially in the form of coatings on electrical conductors.

---

The present application is a continuation-in-part of copending application Ser. No. 641,131 filed May 25, 1967, now abandoned, and assigned to the same assignee as the present application.

It is an object of the invention to provide novel polyimide compounds useful for electrical insulating purposes, and especially in the form of films or coatings on electrical conductors, and to provide novel intermediate compositions useful in the preparation of such compounds.

It is another object of the invention to provide polyimide compounds of the above type having good flexibility, adherence, thermal stability, toughness and electrical properties, and which are easily and economically made from a wide variety of readily obtainable materials.

It is a particular object of the invention to provide polyimide compounds of the above type which are readily moldable at temperatures generally lower than required for known types of polyimide compounds.

Briefly, the present invention relates to novel diamine diepoxide adducts and to novel polyamide-acids and polyimides prepared therefrom. The diamine diepoxide adduct is prepared by reacting a diepoxide compound with a diamine, the latter being present in one mole in excess.

The diepoxide compound may comprise a polyether derivative of a polyhydric organic compound, e.g., polyhydric alcohol or phenols containing at least two phenolic hydroxy groups, said derivatives containing 1, 2 epoxy groups. Such compounds and methods of making them are well known in the art. They may be prepared by effecting reaction between (1) a polyhydric phenol such as hydroquinone, resorcinol, and condensation products of phenol with a ketone, e.g., bis-(4-hydroxyphenyl)-2,2-propane, and (2) epihalogenohydrin, e.g., epichlorohydrin. Such epoxy compounds are disclosed for example in Cass 2,691,007 and other patents therein mentioned. For example, the reaction of epichlorohydrin with bis-(4-hydroxyphenyl)-2,2-propane produces an epoxy resin having the following formula:

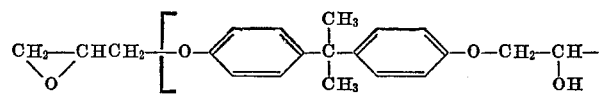

where m is the number of repeating units and has an average value varying from about zero to about 27. A table of data on various epoxy resins of the above type produced by Shell Chemical Corp., under the name of Epon resins are shown in Table I in the aforementioned Cass patent. Epon resin 1009 shown therein is characterized by a formula as shown above wherein m ranges from about 16 to about 27.

Other epoxy compounds which may be used are diepoxides of cyclo-aliphatic type, examples of which are dicyclodiepoxycarboxylates, e.g., 3,4-epoxy - cyclohexylmethyl - 3,4 - epoxy-cyclohexanecarboxylate, and 3,4-epoxy - 6 - methyl-cyclohexylmethyl-3,4-epoxy-6-methylcyclohexanecarboxylate.

Another example of a cyclo-aliphatic diepoxide is a cyclodiepoxydicarboxylate such as the diglycidyl ester of hexahydrophthalic acid, which has the following formula:

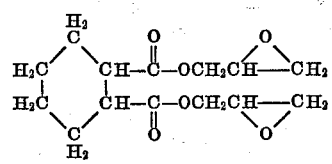

The diamine which is reacted with the epoxy compound in accordance with the invention has the formula:

(I)      $H_2N—R—NH_2$ where R is a divalent organic radical selected from substituted and unsubstituted aliphatic, cyclo-aliphatic, heterocyclic, and aromatic groups, and combinations of such groups such as aliphatic-aromatic groups, the two amino groups being attached to different carbon atoms.

Diamines of aliphatic-aromatic type may be obtained by reacting (1) at least one dibasic acid having the formula:

(II)      $HOOC—R'—COOH$ where R' is an unsaturated or saturated aliphatic group containing from about 1 to 40 carbon atoms with (2) an aromatic diamine of the type shown in Formula I above.

Among the aliphatic dibasic acids which may be utilized are oxalic, malonic, succinic, glutaric, adipic, pimelic, suberic, azelaic, sebacic and dodecanedioic acids, as well as unsaturated acids falling within the above formula including maleic and fumaric acids, among others.

A dibasic acid having a chain thirty-six carbons long is Emery Industries, Inc. 3713–R Dimer Acid. Others will occur to those skilled in the art.

Among the diamines which may be used are those listed in Edwards Pat. 3,179,614 and elsewhere, including benzidine, 4,4'-diaminodiphenyl ether, 3,3' - dimethoxy-4,4'-diaminodiphenyl methane, meta-phenylenediamine, para-phenylenediamine, and others.

In preparing the polyamide-diamine, dibasic acid is reacted with diamine, which latter is about one mole in excess, in a cresol solution to form about a 50% by weight solution. Typically, the reactant mixture is refluxed with stirring for about 1½ to 7 hours with distillation of water from the mixture.

The polyamide-diamine thus obtained may be expressed by the formula:

(III)

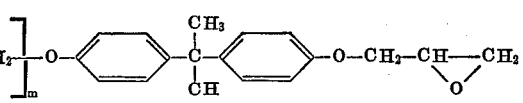

where R is as defined above, R' is a saturated or unsaturated aliphatic hydrocarbon group containing from about 1 to 40 carbon atoms, and x varies from about 1 to 3.

Examples of other diamines which may be employed are ethylenediamine, propylene diamine, 1,4-cyclohexane bis-(methylamine), m-xylylene diamine and 3,3'-diamino-N-methyl dipropylamine.

The reaction between the diamine and the epoxide compound may be carried out by dissolving the diamine in a suitable solvent such as cresol using heat, e.g., about 80° C.–100° C., the amount of solvent being sufficient to provide a 15–20% by weight solution of the final polymer. The amount of the diamine used is about 1 mole in excess. The diepoxide compound is then added to the diamine solution with stirring, and after all the diepoxide compound is dissolved, the solution is heated for a period of time sufficient to effect reaction between the diepoxide compound and the diamine, e.g., one hour at 80° C. or

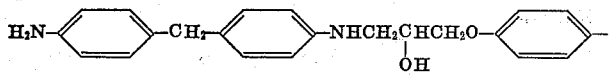

30 minutes at 100° C. The mixture is then cooled to a temperature in the range of about room temperature to

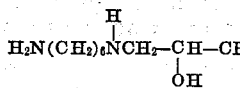

about 50° C. The product of this reaction is a diamine diepoxide adduct having the general formula:

(IV)    $H_2N(R-NH-R''-NH)_xR-NH_2$ where R is as defined above, R'' is an aromatic-containing or cyclo-aliphatic group having at least two OH groups beta to the NH groups, and $x$ varies from about 1 to 3. By "beta" is meant that the OH group is attached to a carbon atom which is separated from the corresponding NH group by one carbon atom. Examples of aromatic-containing groups which R'' may comprise are the following:

and

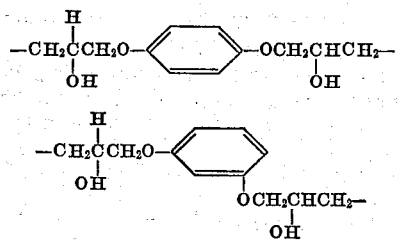

where $m$ is the number of repeating units and varies from about 0 to about 27.

Examples of a cyclo-aliphatic group which R'' may comprise based on the dicyclodiepoxycarboxylates mentioned above are dicyclo-dihydroxy-carboxylates such as the following:

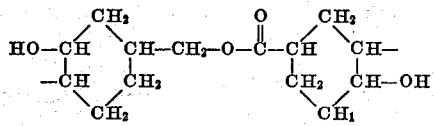

and

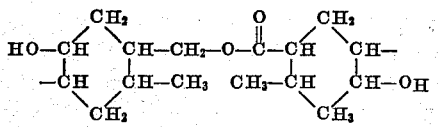

Where the cyclodiepoxydicarboxylate mentioned above is used, R'' comprises a cyclo-dihydroxy-dicarboxylate having the following formula:

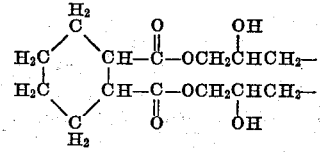

An example of a specific adduct of this type obtained by the reaction of the diglycidyl ether of bisphenol A and p,p'-methylene dianiline has the following formula:

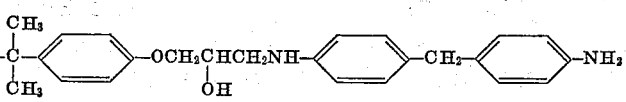

A different specific adduct obtained by the reaction of hexamethylene diamine and diglycidyl ether of bisphenol A has the following formula:

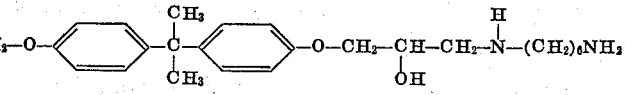

Still another adduct obtained by the reaction of p,p'-methylene dianiline and the diglycidyl ester of hexahydrophthalic acid has the following formula:

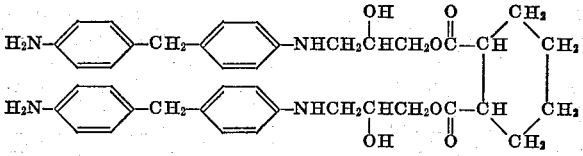

A diamine diepoxide adduct thus obtained is then reacted in substantially equimolar amounts with a dianhydride having the formula:

(V)

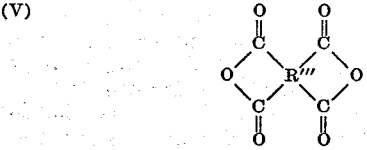

wherein R''' is a tetravalent organic radical selected from substituted and unsubstituted aliphatic, cyclo-aliphatic, heterocyclic, and aromatic groups, and combinations of such groups such as alkylene-aromatic hydrocarbon groups. Among the dianhydrides useful in this connection are pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl) propane dianhydride,
bis(3,4-dicarboxyphenyl) sulfone dianhydride,
perylene 3,4,9,10-tetracarboxylic dianhydride,
bis(3,4-dicarboxyphenyl) ether dianhydride,
naphthalene-1,2,4,5-tetracarboxylic dianhydride,
2,2-bis(2,-3-dicarboxyphenyl) propane dianhydride,
1,1-bis(2,3-dicarboxyphenyl)ethane dianhydride,
1,1-bis(3,4-dicarboxyphenyl) ethane dianhydride,
bis(2,3-dicarboxyphenyl) methane dianhydride, bis(3,4-dicarboxyphenyl) methane dianhydride,
benzene-1,2,3,4-tetracarboxylic dianhydride,
pyrazine-2,3,5,6-tetracarboxylic dianhydride,
thiophene-2,3,4,5-tetracarboxylic dianhydride,
3,4,4',4'-benzophenone tetracarboxylic dianhydride, etc.

Other dianhydrides which may be employed are Nadic dianhydride, benzalazine dianhydride, cyclopentane dianhydride, ethylene-bis(trimellitate) dianhydride, and others.

The reaction between the dianhydride and the diamine epoxy adduct may be carried out by adding dry powdered dianhydride to the thus formed diamine diepoxide adduct in about equimolar amounts with stirring. After about 30 minutes the polyamide-acid has been formed. This polymer may either be converted directly to the polyimide by heating the solution to 80°–100° C. or applied to the article to be coated thereby, and the coating is cured in situ preferably for about 10–20 minutes at about 220° C., or in suitable cases for shorter periods at temperatures up to 300° C. or higher.

Alternatively, for molding or laminating purposes, the diepoxide compound and the diamine may be formed into a homogeneous mixture without the use of a solvent, and the mixture is heated to produce the reaction as described above. This cooled mixture is then pulverized and thoroughly blended with the powdered dianhydride, and this mixture is subjected to suitable pressure at a temperature of about 275–300° C. to produce a rigid structure.

The product obtained from the reaction between the diamine diepoxide adduct and the dianhydride is a polyamide-acid having the general formula:

(VI)
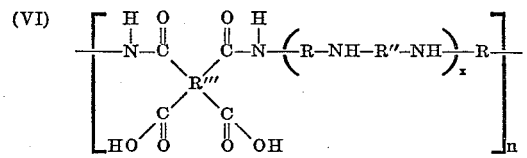

where R, R″, R‴ and x are as defined above and n is at least two.

When the solution of the latter compound is applied to the article to be coated thereby and then cured at the temperatures mentioned above, the polyamide-acid is converted to a polyimide having the general formula:

(VII)
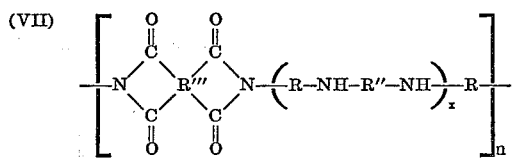

where the various constituents are as defined above.

The examples below will illustrate the practice of the invention, it being understood that they are to be taken as exemplary only. In the examples, the amounts of the ingredients are given in parts by weight:

EXAMPLE 1

In this example, a cyclo-aliphatic epoxy compound, 3,4 - epoxy-cyclohexylmethyl-3,4-epoxy-cyclohexanecarboxylate, 12.6 parts, was dissolved in 100 parts N-methyl-2-pyrrolidone, and this was reacted by heating at a temperature of about 100° with 19.8 parts of p,p'-methylene dianiline in 100 parts of the same solvent. This mixture was cooled and then added to a solution of 16.1 parts of benzophenone tetracarboxylic acid dianhydride in 100 parts of the same solvent. The solution of the reaction product thus obtained was cast onto a thin aluminum sheet in the form of a coating, and this was cured at 220° C. for 10 minutes and thereafter at 300° C. for 5 minutes. A tough, flexible, tightly adherent film 1 mil thick was obtained on the aluminum sheet. This film, as well as all those produced in the following examples, had good electrical insulating properties.

EXAMPLE 2

Diglycidyl ether of resorcinol, 11.1 parts, was mixed in about 275 parts cresol with 19.8 parts of p,p'-methylene dianiline and 16.1 parts of benzophenone tetracarboxylic acid dianhydride. The solution obtained thereby was cast onto a thin aluminum sheet and cured at 220° C. for 10 minutes followed by 5 minutes at 300° C. Tightly adherent, flexible films up to 4 mils thick were thus obtained on the aluminum sheet.

EXAMPLE 3

A solution of p,p'-methylene dianiline, 19.8 parts, in 260 parts of cresol was prepared by heating to 80° C. Diglycidyl ether of bisphenol A [bis(4-hydroxyphenyl) 2,2-propane], 17.0 parts, was added to the warm cresol solution while stirring. This solution was kept at 80° C. for one hour before cooling to room temperature. Benzophenone tetracarboxylic acid dianhydride, 16.1 parts, was added to the diamine-epoxy complex solution and stirred at 50° C. for 30 minutes. A flexible adherent film was formed by casting this solution on an aluminum sheet and curing at 220° C. for 10 minutes.

EXAMPLE 4

An intermediate compound prepared by reacting 2 parts of p,p'-methylene dianiline with 1 part azelaic aicd was dissolved in 260 parts cresol along with 8.5 parts of the diglycidyl ether of Bisphenol A, using 27.5 parts of the intermediate composition. This solution was held at 80° C. for one hour before cooling to about room temperature, and then 8 parts of benzophenone tetracarboxylic acid dianhydride was added with stirring continuing for 30 minutes. This solution was cast on a thin aluminum sheet, and after curing at 220° C. for 15 minutes, excellent films which were both very flexible and very adherent to the aluminum sheet were obtained.

EXAMPLE 5

A very flexible film was prepared from a solution similar to that described in Example 3, except that only 15.6 parts of the benzophenone tetracarboxylic acid dianhydride was used.

EXAMPLE 6

A bisphenol A epoxy with an epoxy equivalent of 0.22 g./100 g. (Araldite 6060), was added in an amount of 50 parts to a warm solution of 19.8 parts p,p'-methylene dianiline in 420 parts cresol. This mixture was heated to 80° C. for one hour before cooling to room temperature, at which time 16.1 parts of benzophenone tetracarboxylic acid dianhydride was added with stirring. After 30 minutes this solution was cast on aluminum and cured at 220° C. The aluminum was dissolved off with dilute hydrochloric acid, leaving a very flexible free film 5 mils thick.

EXAMPLE 7

The epoxide compound described in Example 6 in an amount of 25 parts was dissolved in a warm solution of 27.5 parts of the reaction product of 2 parts p,p'-methylene dianiline and 1 part azelaic acid, in 295 parts cresol. This solution was heated to 80° C. for one hour before cooling to room temperature, and there was then added 8.0 parts of benzophenone tetracarboxylic acid dianhydride. This solution was stirred for 30 minutes and then cast on a thin aluminum sheet and cured at 220° C. for 10–20 minutes. Very flexible free films 1 to 8 mils in thickness were obtained after removing the aluminum with hydrochloric acid.

EXAMPLE 8

The epoxide compound described in Example 6 (Araldite 6060), 50 parts, and 19.8 parts of p,p'-methylene dianiline were pulverized together until thoroughly mixed. This mixture was melted and held at 100° C. for 30 minutes. It was then chilled and ground together with 10.9 parts of pyromellitic dianhydride. 40 parts of this dry mixture was placed in a mold between two layers of glass cloth and heated to 290° C. for about 30 minutes at 6,000 lbs. pressure. This provided a very strong and rigid laminate.

EXAMPLE 9

The dry mixture as formed in Example 8 in an amount of 36.5 parts was mixed thoroughly with 36.5 parts silica (silex) and molded at 290° C. and 15,000 lbs. pressure into a very hard and heat resistant disk 80 mils thick.

EXAMPLE 10

A solution in 53 parts of cresol was prepared of 2.5 parts of diglycidyl ether of bisphenol A (Araldite 6005) and 5.5 parts of the methylene dianiline-azelaic intermediate compound described in Example 4, and the solution was heated at 80° C. for one hour. After the solution was cooled to 50° C., 1 part of benzophenone dianhydride was added thereto. After being stirred for 30 minutes, the solution cast onto a thin aluminum sheet and the coating cured at 220° C. for 15 minutes. A very flexible adherent film was obtained.

EXAMPLE 11

A solution was prepared of the epoxy compound and the intermediate diamine compound of Example 10 using 1 part and 2.9 parts of these compounds respectively, and 21 parts of cresol. After heating the solution for one hour at 80° C., there was added thereto 1 part of an aromatic-aliphatic dianhydride consisting of 7,7'-(2-butenylene) di-2 norbornene-5,6-dicarboxylic anhydride (Araldite x8157/118) and this mixture was stirred for 30 minutes. The resulting solution was cast onto an aluminum sheet and cured at 220° C. for 15 minutes, producing a very adherent flexible film which could be creased without fracture.

EXAMPLE 12

Twelve parts of Epon 1009 and one part of p,p'-methylene dianiline were dissolved in 83 parts of cresol at 80° C. and the solution was held at this temperature for 30 minutes. After cooling it to 40° C., 0.8 part of benzophenone dianhydride was added and stirred for 30 minutes. The reaction mixture was then heated to 80°–100° C. for another 30 minutes. A flexible glass cloth laminate was prepared by immersing strips of glass tape in the solution, removing and then heating them for 10 minutes in a 200° C. oven, and then pressing them at 10,000 p.s.i. and 175° C.

EXAMPLE 13

The process of Example 12 was repeated, using 12 parts Epon 1009, 0.8 part hexamethylene diamine and 0.8 part benzophenone dianhydride. A film cast from this solution on a thin aluminum sheet and cured for 20 minutes at 200° C. was very flexible and adherent.

EXAMPLE 14

The process of Example 12 was repeated, using 1.7 parts of diglycidyl ether of bisphenol A (Dow DER 332), 1.16 parts hexamethylene diamine and 1.6 parts benzophenone dianhydride and produced very flexible tightly adherent films when the solution was cast on thin aluminum sheets and cured for 20 minutes at 200° C.

EXAMPLE 15

The process of Example 12 causing 5 parts Epon 1001, 1.16 parts hexamethylene diamine and 1.6 parts benzophenone dianhydride gave a product from which a very flexible tightly adherent thick film (9 mils thick) was prepared.

EXAMPLE 16

A polymer made from 2 parts oxydianiline, 9 parts Epon 1004 and 1.6 parts benzophenone dianhydride by the method of Example 12 produced very flexible tightly adherent films.

EXAMPLE 17

Flexible films were also made by the process of Example 12 using a reaction mixture of 2 parts p,p'-methylene dianiline, 1.5 parts diglycidyl ester of hexahydrophthalic acid (Araldite CY 183) and 1.6 parts benzophenone dianhydride.

EXAMPLE 18

A solution was prepared of 1.74 parts hexamethylene diamine and 3.0 parts of the diglycidyl ester of hexahydrophthalic acid in 30 parts cresol, and it was heated to 80° C. for 30 minutes. This solution was cooled to 40° C. and 1.6 parts of benzophenone dianhydride were added and stirred for 30 minutes. The solution was then heated to 100° C. over a period of 30 minutes. A flexible adherent film was obtained when this solution was cast on a thin aluminum sheet and cured for 20 minutes at 200° C.

EXAMPLE 19

A solution of 2.3 parts hexamethylene diamine and 4.5 parts diglycidyl ester of hexahydrophthalic acid in 50 parts cresol was prepared and processed in the same manner as in Example 18, and 1.6 parts benzophenone dianhydride were added and the solution processed as in Example 18. Films cast from this solution were also very flexible and adherent.

The compositions provided by the invention may be used for various applications such as electrically insulating coatings for wires and other electrical equipment, adhesives, protective films, and other uses.

While the present invention has been described with reference to particular embodiments thereof, it will be understood that numerous modifications may be made by those skilled in the art without actually departing from the scope of the invention. Accordingly, we wish to have it understood that we intend herein to cover all such modifications as fall within the true spirit and scope of our invention.

What we claim as new and desire to secure by Letters Patent of the United States is:

1. A polyamide-acid consisting essentially of the recurring unit $$\left[ \begin{array}{c} \underset{|}{\text{H}} \underset{\|}{\text{O}} \quad \underset{\|}{\text{O}} \underset{|}{\text{H}} \\ -\text{N}-\text{C} \diagdown \diagup \text{C}-\text{N}-(\text{R}-\text{NH}-\text{R}''-\text{NH})_x-\text{R}- \\ \text{R}''' \\ \diagup \diagdown \\ \text{C} \quad \text{C} \\ \text{HO} \underset{\|}{\text{O}} \quad \underset{\|}{\text{O}} \text{O} \end{array} \right]_n$$

where R is a divalent organic radical selected from the group consisting of aliphatic, cyclo-aliphatic, aromatic, and aliphatic-aromatic groups; R'' is a radical selected from the group consisting of

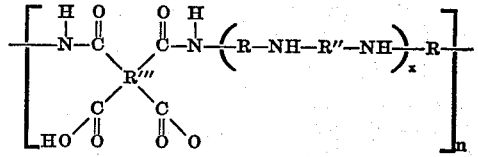

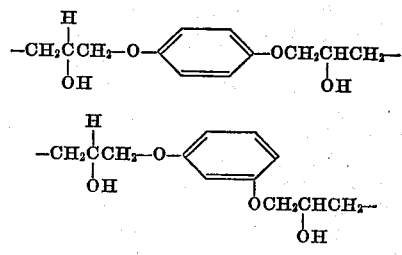

and

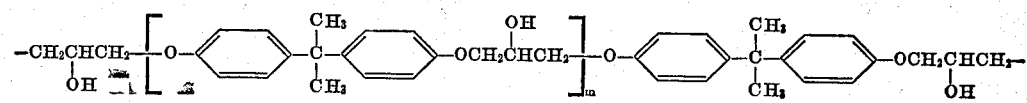

where m is the number of repeating units, and cyclo-dihydroxy-carboxylates obtained as the reaction product of a carboxyl group-containing cycloaliphatic diepoxide and a diamine, wherein said R" radical has at least two OH groups, two of which OH groups are beta to the NH groups; R''' is a tetravalent organic radical selected from the group consisting of aliphatic, cyclo-aliphatic, aromatic, and alkylene-aromatic hydrocarbon group; x is in the range of about 1–3; and n is at least 2.

2. A polyimide consisting essentially of the recurring unit

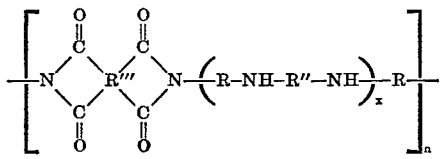

where R is a divalent organic radical selected from the group consisting of aliphatic, cyclo-aliphatic, aromatic, and aliphatic-aromatic groups; R" is a radical selected from the group consisting of:

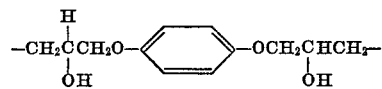

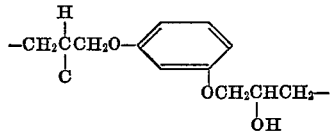

and

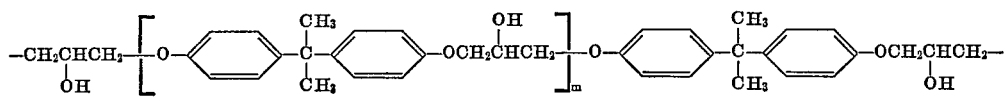

where m is the number of repeating units, and cyclo-dihydroxy-carboxylates obtained as the reaction product of a carboxyl group-containing cyclo-aliphatic diepoxide and a diamine, wherein said R" radical has at least two OH groups, two of which OH groups are beta to the NH groups; R''' is a tetravalent organic radical selected from the group consisting of aliphatic, cyclo-aliphatic, aromatic, and alkylene-aromatic hydrocarbon groups; x is in the range of about 1–3; and n is at least 2.

3. A metal having a coating thereon of a polyimide as defined in claim 2.

4. The method of making a polyamide-acid which comprises reacting at from about room temperature to about 80° C. (1) a diamine diepoxide adduct having the general formula H$_2$N—(R—NH—R"—NH)$_x$—R—NH$_2$ where R is a divalent organic radical selected from the group consisting of aliphatic, cyclo-aliphatic, aromatic, and aliphatic-aromatic groups; R" is a radical selected from the group consisting of:

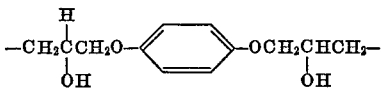

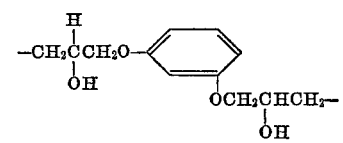

and

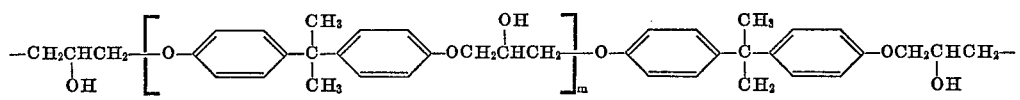

where m is the number of repeating units, and cyclo-dihydroxy-carboxylates obtained as the reaction product of a carboxyl group-containing cyclo-aliphatic diepoxide and a diamine, wherein said R" radical has at least two OH groups, two of which OH groups are beta to the NH groups; and x varies from about 1–3; with (2) a dianhydride having the formula

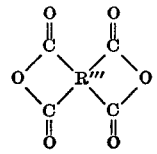

where R''' is a tetravalent organic radical selected from the group consisting of aliphatic, cyclo-aliphatic, aromatic, and alkylene-aromatic hydrocarbon groups.

References Cited
UNITED STATES PATENTS

| | | | |
|---|---|---|---|
| 3,179,614 | 4/1965 | Edwards | 260—30.2 |
| 3,242,213 | 3/1966 | Preston et al. | 260—558 |
| 3,437,636 | 4/1969 | Angelo | 260—47 |

WILLIAM H. SHORT, Primary Examiner

L. L. LEE, Assistant Examiner

U.S. Cl. X.R.

117—128.4, 132 B, 161 P; 161—197, 227; 260—30.2, 33.4 P, 65, 78 TF, 326 N

UNITED STATES PATENT OFFICE
CERTIFICATE OF CORRECTION

Patent No. 3,679,632        Dated July 25, 1972

Inventor(s) Ralph G. Flowers and Thomas L. Sherer

It is certified that error appears in the above-identified patent and that said Letters Patent are hereby corrected as shown below:

Col. 1, formula 1 - the number "3" is left out of the last portion of the formula following the bracket.

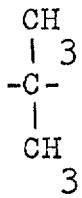

Col. 5, line 5, "3,4,4',4'" should read - 3,4,3',4' -

Col. 6, line 26, "aicd" should be - acid -

Col. 7, line 2, "colth" should be - cloth -

Col. 7, line 19, after "solution", insert - was -

Col. 7, line 66, "causing" should be - using -

In the Claims:

Claim 4, line 24, last portion of the formula, "2" should be

- 3 -

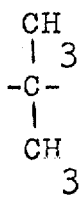

Signed and sealed this 1st day of May 1973.

(SEAL)
Attest:

EDWARD M. FLETCHER, JR.          ROBERT GOTTSCHALK
Attesting Officer                 Commissioner of Patents